Sept. 27, 1927.

J. F. PALMER 1,643,514

PNEUMATIC TIRE

Filed Oct. 2, 1923

Patented Sept. 27, 1927.

1,643,514

UNITED STATES PATENT OFFICE.

JOHN F. PALMER, OF BUFFALO, NEW YORK.

PNEUMATIC TIRE.

Application filed October 2, 1923. Serial No. 666,104.

This invention relates to improvements in pneumatic tires and is a ramification of the broad invention disclosed in my co-pending application 562,235, filed May 6, 1922.

In the prior filed application, I disclosed a "tangent laid" carcass of normal oblate cross-sectional contour having associated therewith a continuous resilient web of rubber functioning to normally maintain the tire in oblate contour and resiliently resisting its distension from such contour, this construction permitting the obtaining of a number of very meritorious and novel results in addition to the maintenance of a flat contact therein under load.

In the instant application, I have provided an inner tube with which is formed or associated a similar resilient rib for functioning in the same manner in combination with an enclosing tire casing.

Figure 1:
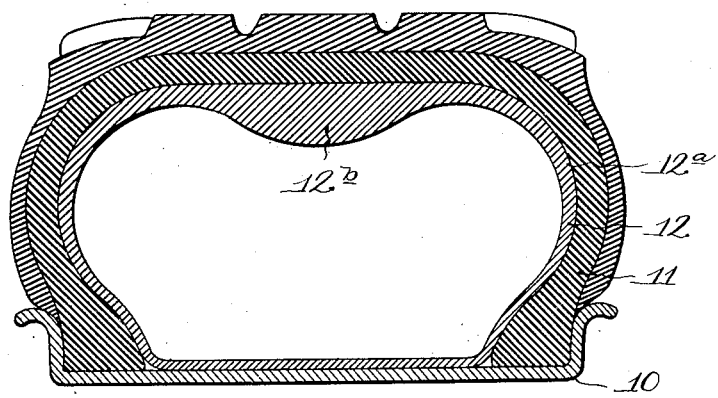

I have disclosed several embodiments of my invention in the accompanying drawing, in which Figure 1 is a transverse section through a casing of normal oblate cross-sectional contour in which is located an inner tube embodying the instant invention.

Figure 2:
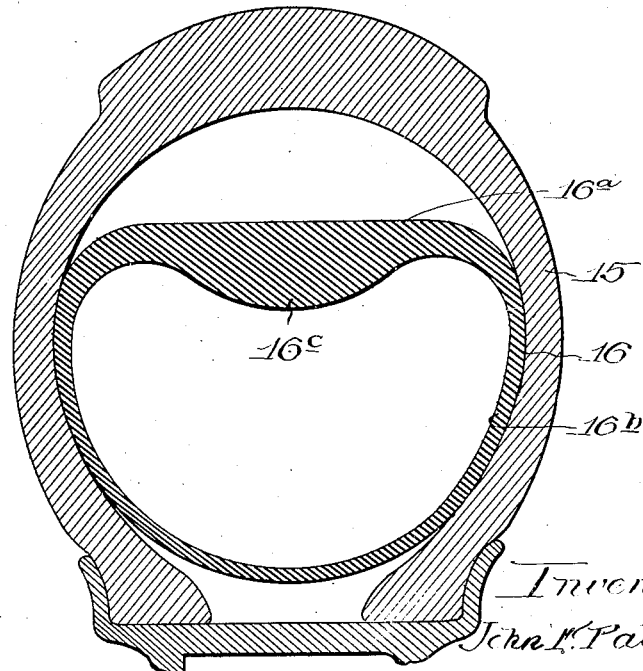

Fig. 2 is a similar transverse cross-section through a tire of normally substantially circular cross-section as constructed in present day practice.

In the embodiment disclosed in Fig. 1, 10 indicates a rim flanged for the combination of the tire casing 11, which is of normally oblate cross-sectional contour, as disclosed in my co-opending application 562,235, with the exception of the resilient rib shown therein. 12 indicates an inner tube having the side walls 12$^a$ gradually increasing in thickness and merging with a resilient rubber rib 12$^b$, preferably located intermediate the sides at the outer portion of the tube. As shown in the drawings, this tube is shown in its normal uninflated or slightly inflated contour.

When the tire is inflated to the desired pressure, as, for example, one hundred pounds, the casing 11 and tube 12 will be extended at the outer portion to arcuate contour, which distention will be resisted by the rib 12$^b$ which is thereby placed under tension. This tension serves to partially neutralize the air pressure within the tube so far as action under load is concerned so that when a relatively light load is carried upon the inflated casing a cushioning effect will be obtained as if under low inflation, which, however, will not affect the supporting function of the casing and the effect of the rib will be gradually decreased to zero as the casing is depressed toward its uninflated contour at which the maximum load contact is had. Depression of the casing below its normal contour, as when striking a rock, obstacle or the like will likewise be resisted by the rib 12$^b$ which is again put under tension and coacts in such resistance with the air pressure to resist such depression.

In Fig. 2, I have illustrated a present day casing 15 of substantially circular cross-sectional contour, which obviously will not be susceptible of appreciable distention under inflation as circular contour is that which a tire will naturally assume according to the laws of physics. In the casing 15, I show a tube 16 of part circular contour having the flattened upper portion 16$^a$, the side-walls 16$^b$ being gradually thickened to merge into the large resilient rubber rib 16$^c$ located beneath the flattened portion 16$^a$. As the tube is inflated to fill the interior of the casing 15, rib 16$^c$ is put under tension, as described in connection with the showing in Fig. 1, and the function will be substantially similar in that the circular casing will be permitted to approximate an oblate contour under load until the balance results between the resistance of the air pressure, tension of the rib 16$^c$, and the load upon the casing so that a flat tread contact under load may be obtained with a substantially circular casing with the required inflation, thus permitting results similar in proportion at least to those obtained by the more desirable normally oblate contour casing described above.

I do not wish to be restricted to the form of my invention as shown in the accompanying drawings and described in the specification, except as defined in the appended claims.

What I claim is:

1. The combination with a casing of normally oblate cross-sectional contour, of an inflatable inner tube, said tube being provided with means resiliently resisting distention of said casing and tube from such normal contour.

2. In combination with a casing of normally oblate cross-sectional contour, an inflatable inner tube of analogous contour, said tube being provided with means to resiliently resist distention from normal contour of said casing and tube.

3. In combination with a casing of normally oblate cross-sectional contour, an inflatable inner tube of homologous contour; said tube being provided with a resilient rubber rib resisting distention beyond normal contour of said tube and casing.

In testimony whereof, I have subscribed my name.

JOHN F. PALMER.